3,385,628
AUTOMATIC FRONT SEAT LOCKS
Joseph Mandoza Romulus Lahaie, 39 Hotel-de-Ville St.,
Hull, Quebec, Canada
Filed Sept. 19, 1966, Ser. No. 580,535
5 Claims. (Cl. 296—63)

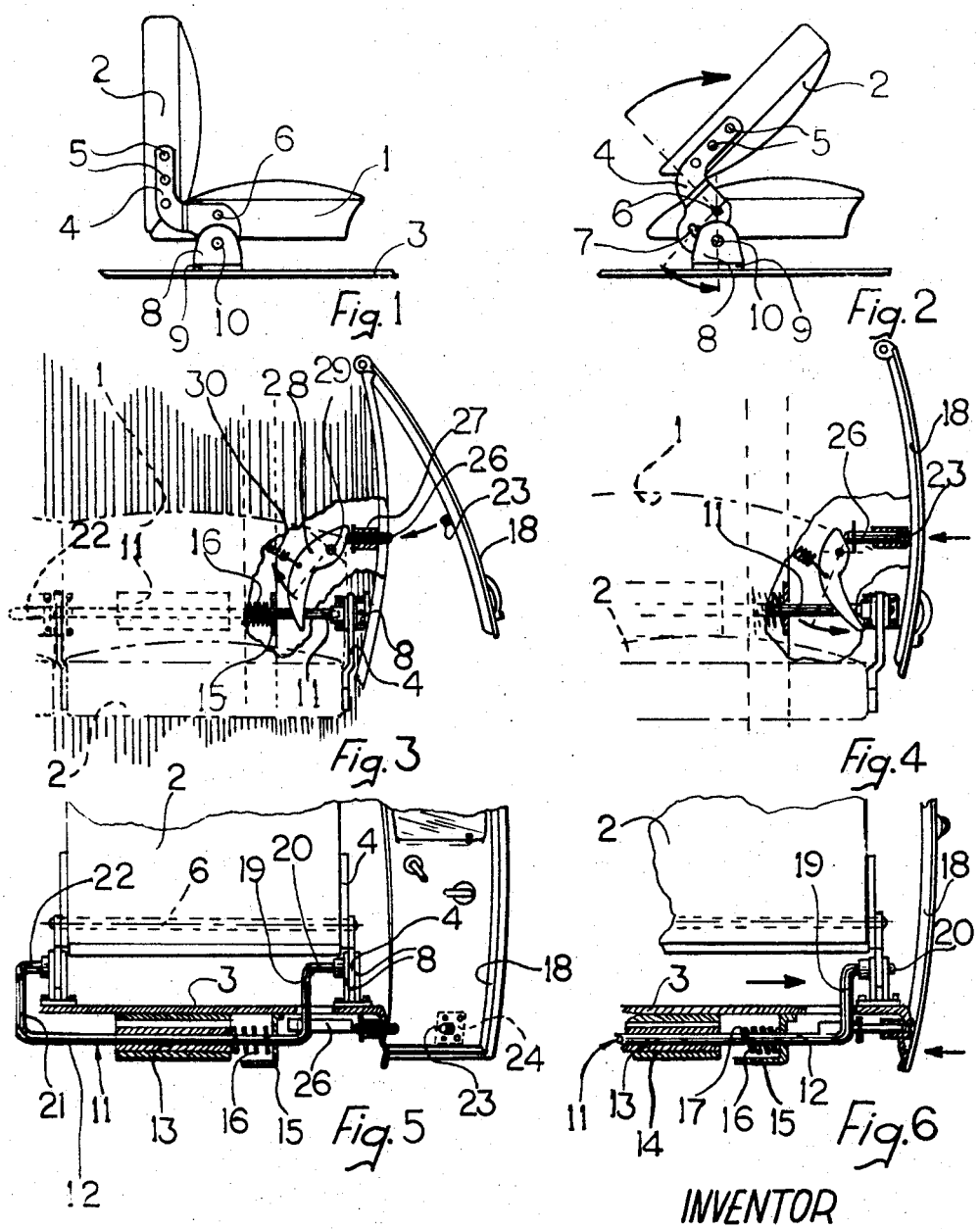

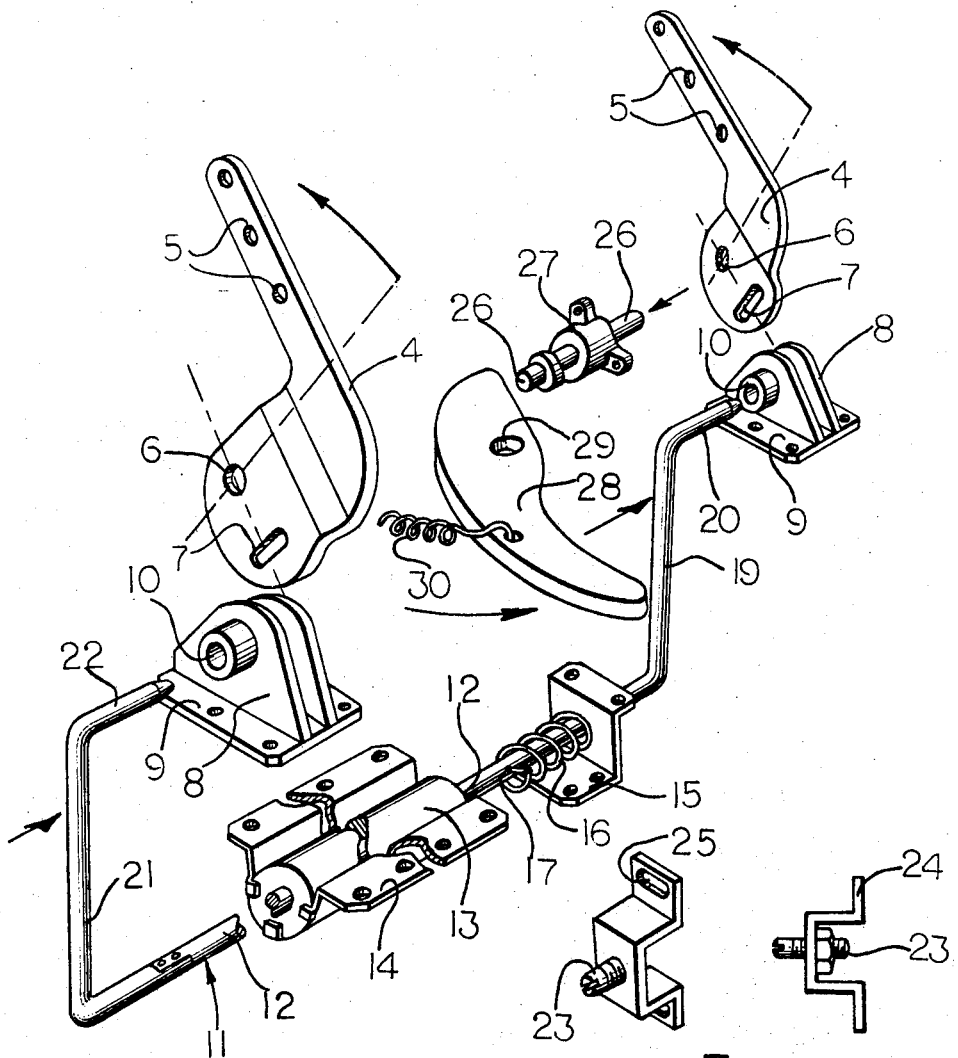

ABSTRACT OF THE DISCLOSURE

The invention relates to a back-rest lock for the front seat of an automobile in which a U-shaped locking member is actuated through a lever by the closing of the vehicle door so that its latching portions slide into bores of the pivotal arms of the back-rest to lock the same and are pushed out again into unlocking position by a spring when the door is opened.

---

The present invention relates to motor vehicles and, more particularly, to a locking device for the back-rest of the front seat of a two-door automobile.

The general object of the present invention resides in the provision of a safety device which will automatically lock up the back-rest of the front seat of a two-door automobile to prevent injuries to passengers riding in the front.

Another object of the present invention resides in the provision of a safety lock of the character described, which becomes automatically operative to lock the back-rest of the front seat upon closing of the door of the automobile and which automatically releases the said back-rest for pivotal movement, upon opening of said automobile door.

Another object of the present invention resides in the provision of a safety locking device of the character described, which is of relatively simple and inexpensive construction and of fool-proof operation.

Another object of the present invention resides in the provision of a safety locking device of the character described, which is operative irrespective of the adjusted position of the front seat forwardly or rearwardly of the automobile.

The foregoing and other important objects of the present invention will become more apparent during the following disclosure and by referring to the drawings, in which:

FIGURE 1 is a schematic side elevation of the front seat of a motor vehicle of the two-door coach type, the back-rest of the seat being shown in locked upright position;

FIGURE 2 is a similar side elevation of the front seat with the back-rest in unlocked pivoted position;

FIGURE 3 is a somewhat schematic top plan view of the arrangement of the front seat safety locking device of the invention and the partially open door of the vehicle, the locking device being in unlocking position;

FIGURE 4 is a partial top plan view, similar to that of FIGURE 3, showing the door in closed position and the safety locking device in locking position;

FIGURE 5 is a transverse section of an automobile floor, taken along the safety lock and with the safety lock and door in the position of FIGURE 3;

FIGURE 6 is a transverse section, similar to that of FIGURE 5, but with the safety lock and door in the position of FIGURE 4;

FIGURE 7 is an exploded perspective view of the safety locking device; and

FIGURE 8 is a side elevation of the striker secured to the door.

In the drawings, like reference characters indicate like elements throughout.

Reference numeral 1 indicates the front seat of a two-door motor vehicle, said front seat having a pair of back-rests 2 pivotable with respect to the front seat, as shown in FIGURE 2, to allow entrance and exit of the passengers into and from the back of the car.

The front seat 1 is normally mounted on rails (not shown) so as to be adjustable rearwardly and frontwardly with respect to the floor 3 of the car.

In accordance with the invention, an arm 4 is rigidly secured to the outer end of each back-rest 2 in the region of the pivotal connection of the latter to seat 1. Arms 4 may serve themselves as the hinges for the back-rest or may be additions to said hinges in the case of the safety lock of the invention if installed in an already manufactured car.

In the system shown, the arms 4 serve as hinges for the back-rests and they are secured to the back-rests at holes 5 and are each provided with a hole 6 for receiving the pivot of the back-rest on the front seat and are extended downwardly, below the front seat to form an extension provided with a locking slot 7.

Double-walled locking brackets 8 are secured to floor 3 under the front seat 1 by means of their flanges 9. Said locking brackets 8 are adapted to slidably receive the extension of the arms 4, provided locking slots 7 between the two walls of the bracket and said locking brackets 8 have a throughbore 10 adapted to register with the locking slots 7 of the back arms 4 only in the upright operative position of the back-rest 2, but irrespective of the longitudinal adjusted position of the front seat 1, due to the elongated shape of locking slots 7.

There are two locking brackets 8 secured to the floor 3 of the motor vehicle, one at each end of the front seat and underneath the same.

A U-shaped locking shaft 11 is disposed underneath the floor 3 transversely of the motor vehicle, that is longitudinally of the front seat and under the same. Locking shaft 11 comprises a straight central portion 12 which is longitudinally slidably mounted within a sleeve 13 rigidly secured to floor 3 underneath the same by means of bracket 14. Locking shaft central portion 12 extends freely through the hole of another bracket 15 secured to the floor 3 underneath the same.

A compression coil 16 surrounds the central portion 12 of locking shaft 11, is attached at one end 17 to said locking shaft, while its other end abuts against the bracket 15.

Bracket 13 is disposed towards the car door 18, preferably the door on the driver's side, with respect to the bracket 14.

Past the bracket 13, the locking shaft 11 is bent to form an upright extension 19 constituting one side of the U extended by horizontal latching end portion 20.

Said end portion 20 always engages the bore 10 of locking bracket 8 nearest the door 18. Normally, the end portion 20 is urged into an unlocking position under the action of coil spring 16 so as to terminate short of the space between the two walls of the bracket 8 for free movement of the arm 4 of the back-rest 2.

Similarly, the end of the locking shaft 11 opposite the door 18 is provided with an upright extension 21 constituting the other side of the U terminated by another latching end portion 22 extending towards door 18, that is in the same direction as end portion 20 of upright 19 and the end portion 22 of the locking shaft always engages the bore 10 of the locking bracket 8 farther away from the door 18. But in the unlocking position of the locking device, end portion 22 terminates short of the space between the two walls of the associated bracket 8 so as to allow free movement of the arm 4 therein.

To lock the two back-rests 2 against substantial pivotal movement, the locking shaft 11 is made to move longitudinally within sleeve 13 towards the door 18 so that the end portions 20 and 22 of the locking shaft will engage and extend through the locking slots 7 of the arms 4 when the backrests 2 are in pivoted upright position. More particularly, the means to move the locking shaft 11 against the action of the spring 16 are automatically operated by the door 18 upon closing of the same.

For this purpose, the door is provided near its bottom edge with a striker member 23 in the form of a bolt adjustably screwed within a bracket 24 secured to the inside of the door near the bottom edge thereof.

Bracket 24 is provided with elongated slots 25 for adjustably securing said bracket to the door longitudinally of the latter.

Striker 23 is positioned opposite a plunger 26 longitudinally reciprocable in a sleeve 27, adapted to be secured to the car frame and such that the plunger 26 will protrude laterally of the car in alignment with the striker 23 to be pushed inwardly by said striker upon closing of door 18.

The plunger and sleeve assembly 26, 27 is preferably mounted underneath the floor 3 of the car. The plunger 26 is adapted to abut against one end of a lever 28 which is pivoted at 29 for pivotal movement in a substantially horizontal plane and which is disposed underneath the car floor 3, the pivot of the lever being secured underneath said car floor.

The other end of lever 28 is adapted to engage the upright extension 19 of the locking shaft 11 behind the same, relative to door 18, so that the lever 28 will be caused to pivot under the action of striker 23 to move the locking shaft 11 into locking position against the action of the coil spring 16.

The striker 23 and the plunger 26 are so adjusted and arranged that plunger 26 will be retracted by the striker just at the end part of closing movement of the door 18.

Lever 28 is provided with a tension spring 30 attached thereto and to the car frame or floor 3 underneath the latter, so as to return the lever 28 into a position allowing return action of coil spring 16.

The provision of lever 28 obviates having a portion of the plunger 26 protruding excessively from the side of the motor vehicle floor or, inversely, allows to make striker 23 nearly inconspicuous.

From the foregoing, it is seen that, when the car door 18 is open, the locking shaft 11 is kept in an unlocking position under the action of spring 16 and, therefore, one or the other back-rest 2 may pivot freely but, when the passengers are in the car and with the back-rests 2 in upright position, the latter will become automatically locked in said position upon closing of the door 18 and will stay locked as long as the door is closed.

The back-rests 2 in their locked position can pivot only to a very small extent due to the presence of slots 7. However, slots 7 are necessary to allow for back-and-forth adjusting movement of front seat 1.

However, locking slots 7 could be replaced by holes of a diameter just to receive the end portions of the locking shaft 11; but, in this case, the brackets 8 would have to be secured directly to the front seat frame underneath the same and the uprights 19 and 21 made telescopic so as to always engage the through bore 10 of the brackets 8 which would themselves move along with the front seat 1 during adjusting movement of the latter.

The locking device of the present invention, because it automatically and positively locks the back-rest of the front seat, will prevent serious injuries or even death to persons riding in the front seat, since, if there are people riding in the back, the impact in case of head-on collision or sudden stop, will throw them forward and, most surely, cause the front passengers to hit the dashboard or even crash through the windshield.

In the case of a two-door car having a pair of independent front seats, it is obvious that the locking device of the present invention could be made as to independent units, one for each front seat and each operated by the adjacent door.

While a preferred embodiment in accordance with the invention has been illustrated and described, it is understood that various modifications may be resorted to without departing from the scope of the appended claims.

What I claim is:
1. In combination with a motor vehicle having a door and a seat provided with a pivotable back-rest, a locking member slidably mounted onto the vehicle, carrying latching portions rigid therewith engageable with portions of the back-rest on both sides thereof, a spring urging said member so that said latching portions are out of engagement with said back-rest portions, a pivotally mounted lever engageable with said locking member, means engageable by said door, when moved to a closed position, for actuating said lever to move said locking member into a position where said latching portions engage said back-rest portions and lock said back-rest against pivotal movement.

2. In the combination claimed in claim 1, wherein said back-rest portions engaged by said latching portions have a longitudinal extent along the fore and aft vehicle direction to allow locking in any adjusted position of the seat.

3. In the combination claimed in claim 1, wherein said locking member is a U-shaped rod having a straight bottom portion along which said rod is slidably mounted for longitudinal movement, said latching portions comprising end portions of said rod bent parallel to said straight portion in the same direction.

4. In the combination claimed in claim 3, wherein said U-shaped rod has side portions, one of which is engaged by said lever.

5. In the combination claimed to claim 3, wherein brackets are secured to the vehicle having bores receiving said end portions in any position of said locking member.

References Cited
UNITED STATES PATENTS 2,624,613   1/1953   Parmely _____ 296—65

BENJAMIN HERSH, *Primary Examiner.*

J. H. BRANNEN, J. A. PEKAR, *Assistant Examiners.*